(12) United States Patent
Nikula

(10) Patent No.: US 9,171,023 B2
(45) Date of Patent: Oct. 27, 2015

(54) MECHANISM FOR UPDATES IN A DATABASE ENGINE

(71) Applicant: RETAIL LOGISTICS EXCELLENCE—RELEX OY, Helsinki (FI)

(72) Inventor: Marko Nikula, Helsinki (FI)

(73) Assignee: RETAIL LOGISTICS EXCELLENCE—RELEX OY, Helsinki (FI)

( * ) Notice: Subject to any disclaimer, the term of this patent is extended or adjusted under 35 U.S.C. 154(b) by 45 days.

(21) Appl. No.: 14/346,723

(22) PCT Filed: Sep. 21, 2012

(86) PCT No.: PCT/FI2012/050911
§ 371 (c)(1),
(2) Date: Mar. 22, 2014

(87) PCT Pub. No.: WO2013/041774
PCT Pub. Date: Mar. 28, 2013

(65) Prior Publication Data
US 2014/0258343 A1 Sep. 11, 2014

(30) Foreign Application Priority Data
Sep. 22, 2011 (FI) ...................................... 20115932

(51) Int. Cl.
*G06F 17/30* (2006.01)
(52) U.S. Cl.
CPC .... *G06F 17/30292* (2013.01); *G06F 17/30315* (2013.01); *G06F 17/30377* (2013.01)
(58) Field of Classification Search
CPC .................... G06F 17/30292; G06F 17/30315; G06F 17/30377
See application file for complete search history.

(56) References Cited

U.S. PATENT DOCUMENTS 8,935,223 B2 * 1/2015 Ganesh et al. ................ 707/693
2002/0116403 A1 8/2002 Weedon
(Continued)

FOREIGN PATENT DOCUMENTS

EP 2 079 022 A1 7/2009

OTHER PUBLICATIONS

"Merging Differential Updates in In-Memory Column Store," by Krueger et al. In: DBKDA 2011 (Jan. 2011). Available at: http://www.researchgate.net/profile/Martin_Grund/publication/228427673_Merging_Differential_Updates_in_In-Memory_Column_Store/links/09e4150abe4506ebb6000000.pdf.*

(Continued)

*Primary Examiner* — Daniel Kinsaul
(74) *Attorney, Agent, or Firm* — Birch, Stewart, Kolasch & Birch, LLP

(57) ABSTRACT

A method for database processing includes allocating primary, secondary and tertiary data structures for each column. Columnar content is written into the primary data structure. Updated values are written into the tertiary data structure. Storage keys indicate correspondence to the primary data structure. Query responses involve first reading updated values from the tertiary data structure, sorting by storage keys, storing into the secondary data structure, and clearing the tertiary data structure. Then the primary and secondary data structures are consulted to respond to the query, reading the value for each row from the secondary data structure where present, otherwise from the primary data structure. A commit phase produces a new version of the primary data structure by merging the secondary data structure and an old version of the primary data structure, consulting them in a similar manner.

10 Claims, 3 Drawing Sheets

(56) References Cited

U.S. PATENT DOCUMENTS

| | | |
|---|---|---|
| 2008/0059492 A1 | 3/2008 | Tarin |
| 2008/0120304 A1 | 5/2008 | Calio et al. |
| 2009/0006399 A1* | 1/2009 | Raman et al. ............. 707/7 |
| 2009/0077078 A1 | 3/2009 | Uppala et al. |
| 2009/0187787 A1 | 7/2009 | Jang et al. |
| 2010/0235335 A1 | 9/2010 | Heman et al. |
| 2011/0219020 A1 | 9/2011 | Oks et al. |
| 2012/0221528 A1* | 8/2012 | Renkes et al. ........... 707/674 |

OTHER PUBLICATIONS

"Fast Updates on Read-Optimized Databases Using Multi-core CPUs," by Krueger et al. In: Proc. VLDB Endowment, vol. 5, No. 1 (2011). Available at: ACM.*

M. Stonebraker, et al., "C-Store: A Column-Oriented DBMS", Proceedings of the 31st Conference on Very Large Databases VLDB 2005, Trondheim, Norway, 2005, 13 pages.

* cited by examiner

MECHANISM FOR UPDATES IN A DATABASE ENGINE

FIELD OF THE INVENTION

The present invention generally relates to what is commonly called a database engine, that is, a programmed data processing apparatus that implements internal operations of a database, such as data creation, reading, updating and deletion, regardless of the cognitive meaning of the data. More particularly, the invention relates to the performance of a database in the presence of a large volume of updates.

BACKGROUND OF THE INVENTION

Reference document 1 (Stonebraker et al.) generally explains how column-oriented databases differ from more traditional row-oriented databases. In very general terms, in a traditional row-oriented database engine attributes of a record (or tuple) are placed contiguously in storage. Row-oriented database engines provide good performance for writing (inserting and updating data), and they are efficient for On-Line Transaction Processing ("OLTP"). Stonebraker et al. also disclose an example of a column-oriented database engine in which the values for each single column (or attribute) are stored contiguously. A column-oriented storage layout supposedly allows for better compression of data, because typically the variation among the same attribute for all records is smaller than the variation among all the attributes of a single record. In a modern database server the performance bottleneck is often the data transfer speed to and from the permanent storage, and better compression alleviates this bottleneck. As a result, column-oriented database engines are increasingly popular for applications that involve reading large volumes of data. Such applications are frequently called On-Line Analytical Processing ("OLAP") applications. OLAP database engines are optimized for reading or query processing in applications wherein a query may span a great deal of all the data stored in the database.

One of the problems associated with the above arrangement is related to the fact that when an attribute of a record in the database is to be updated, it may not be possible to update that piece of data in-place in the compressed form. Typically, the entire compressed data block has to be re-compressed. If there is a large volume of updates to process, this re-compression may have a great adverse effect on the update performance in a column-oriented database which utilizes compression.

DISCLOSURE OF THE INVENTION

An object of the present invention is thus to provide a method, an apparatus and a computer program product so as to alleviate one or more of the problems identified above. The object of the invention is achieved by aspects of the inventions as defined in the attached independent claims. The dependent claims and the following detailed description and drawings relate to specific embodiments which solve additional problems and/or provide additional benefits.

An aspect of the invention is a method according to claim 1. Other aspects of the invention include an apparatus for carrying out the method and a computer program product whose execution in an appropriately configured programmed data processing system causes the system to carry out the method according to claim 1.

Another aspect of the invention includes a database server system configured to carry out the inventive method. Yet another aspect of the invention is a computer program carrier embodying a computer program suite for carrying out the inventive method when the program suite is executed on the database server system.

The invention can be implemented as a method for operating a computer-implemented database. As is well-known, the operation of a computerized database comprises several phases, such as database set-up phase, a write phase, an update phase, a query phase and a commit phase. In a method according to the invention, a database server performs the following steps for each of one or more columns in each of one or more tables:

The set-up phase comprises allocating at least one primary data structure, at least one secondary data structure, and at least one tertiary data structure. For the purposes of the present invention, the set-up phase is the phase wherein various data structures are allocated. Allocation of data structures can be fixed or dynamical, and preferably a mixed allocation strategy is implemented, such that allocation is fixed for the primary data structure(s) but dynamical for the secondary and tertiary data structures. Dynamical allocation means that the data structures can grow and shrink as needed.

For a non-partitioned table, one each of the primary, secondary and tertiary data structure suffices per column, but for horizontally partitioned tables, a separate primary, secondary and tertiary data structure should be allocated for each horizontal partition of a column. In the interest of brevity and clarity, the remaining steps of the method will be described for the non-partitioned case.

The write phase comprises writing columnar content in a compressed format into the primary data structure. This step can be performed similarly to writing columnar content in a known database.

The update phase comprises writing an updated value for each updated column of each updated row into the tertiary data structure of the respective column, along with a storage key that indicates a corresponding row in the primary data structure. Two items are thus written for each updated value, namely the value itself and a storage key that links the value to its corresponding row in the primary data structure. The primary data structure need not have an explicit storage key, and the row number can be used as an implicit storage key. But because the tertiary data structure stores only updated values in the order in which the values have been updated, the rows of the tertiary data structure do not have a one-to-one correspondence to the rows of the primary data structure. Hence there is a need for an explicit storage key that associates each updated value in the tertiary data structure with its counterpart in the primary data structure.

The query phase comprises reading the updated values and the storage keys from the tertiary data structure, sorting the updated values by their storage keys and storing the sorted values and the storage keys in the sorted order into the secondary data structure, and clearing the tertiary data structure. As a result of this step, both the primary data structure and the secondary structure are sorted according to the same key, namely the storage key that associates each value of the secondary data structure with its counterpart (value prior to updating) in the primary data structure. Then the server computer responds to the database query by consulting the primary data structure and the secondary data structure. This means that the value for a storage key is read from the secondary data structure if the secondary data structure holds a value for that storage key. Otherwise the value is read from the primary data structure.

The database commit phase comprises producing a new version of the primary data structure by merging the secondary data structure and an old version of the primary data structure. Similarly to the consulting operation, the merging operation comprises reading a value for a storage key from the secondary data structure if the value exists and otherwise from the primary data structure.

BRIEF DESCRIPTION OF THE DRAWINGS

In the following, the invention will be described in greater detail by means of specific embodiments with reference to the attached drawings, in which FIG. 1 schematically illustrates an operating principle of the invention.

DETAILED DESCRIPTION OF THE SPECIFIC EMBODIMENTS

Figure 1:
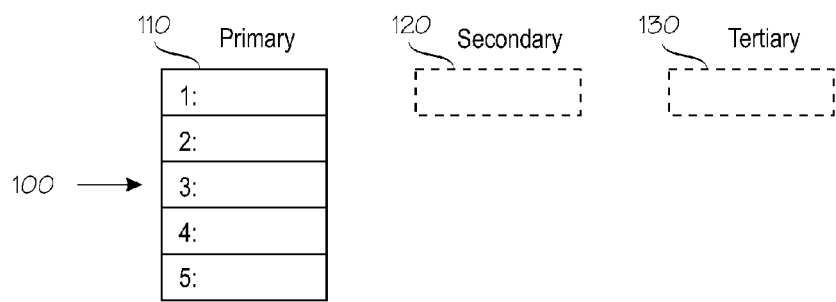

FIG. 1 schematically illustrates an operating principle of the invention. For the sake of clarity and brevity, FIG. 1 only illustrates a data structure for one column of one table of a columnar database, and any remaining columns and tables may be processed similarly. A columnar database, generally denoted by reference numeral 100, comprises a primary data structure 110, a secondary data structure 120 and a tertiary data structure 130. Initially, when the database is empty, new data is written into the primary data structure 110. The numbers 1 through 5 schematically depict storage keys within the primary data structure 110. Later, when updated content is to be written into the database 100, the updated content is written into the tertiary data structure 130. Writing of the updated content into the tertiary data structure 130 takes place without sorting, whereby writing speed is maximized. Still later, when queries are to be made into the database, the updated content is read from the tertiary storage 130, sorted and written as sorted content into the secondary data structure 120. As shown in FIG. 1, the tertiary and secondary data structures 130, 120 are generally smaller than the primary data structure 110. Hashed lines in the secondary and tertiary data structures 120, 130, indicate that the allocation of storage is dynamic rather than fixed, and the data structures 120, 130 may grow and shrink as needed.

Separating the sorting operation from the update operations, which maximizes the speed of writing updates at the expense of reading speed of the updated content, may appear counter-intuitive in connection with OLAP databases. But reading speed is most crucial in operations involving large data ranges, and such operations can be optimized by performing the sorting separately from updating.

Figure 2:
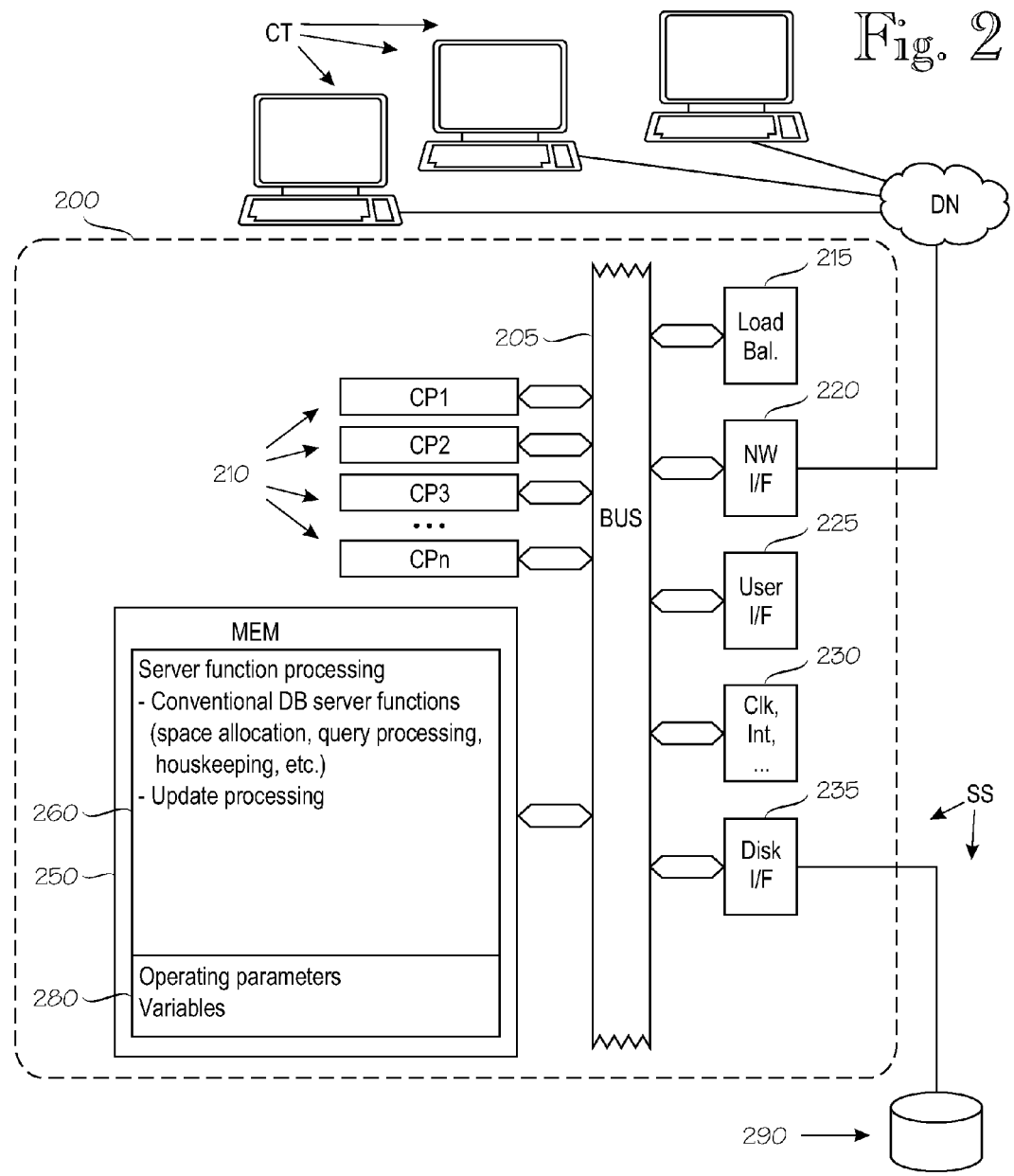
FIG. 2 schematically shows a block diagram of a database server system.

FIG. 2 schematically shows a block diagram of a database server system SS. The two major functional blocks of the database server system SS are a database server computer 200 and a disk system 290. The server computer 200 comprises one or more central processing units CP1 ... CPn, generally denoted by reference numeral 210. Embodiments comprising multiple processing units 210 are preferably provided with a load balancing unit 215 that balances processing load among the multiple processing units 210. The multiple processing units 210 may be implemented as separate processor components or as physical processor cores or virtual processors within a single component case. The server computer 200 further comprises a network interface 220 for communicating with various data networks, which are generally denoted by reference sign DN. The data networks DN may include local-area networks, such as an Ethernet network, and/or wide-area networks, such as the internet. The server system SS serves one or more client terminals, generally denoted by reference sign CT, via the data networks DN.

The server computer 200 of the present embodiment also comprises a user interface 225. Depending on implementation, the user interface 225 may comprise local input-output circuitry for a local user interface, such as a keyboard, mouse and display (not shown). Alternatively or additionally, management of the server computer 200 may be implemented remotely, by utilizing the network interface 220 and a terminal similar to the client terminals CT. The nature of the user interface depends on which kind of computer is used to implement the server computer 200. If the server computer 200 is a dedicated computer, it may not need a local user interface, and the server computer 200 may be managed remotely, such as from a web browser over the internet, for example. Such remote management may be accomplished via the same network interface 220 that the server computer utilizes for traffic between itself and the client terminals.

The server computer 200 also comprises memory 250 for storing program instructions, operating parameters and variables. Reference numeral 260 denotes a program suite for the server computer 200.

The server computer 200 also comprises circuitry for various clocks, interrupts and the like, and these are generally depicted by reference numeral 230. The server computer 200 further comprises a disk interface 235 to the disk system 290. The various elements 210 through 250 intercommunicate via a bus 205, which carries address signals, data signals and control signals, as is well known to those skilled in the art.

The inventive method may be implemented in the server system SS as follows. The program suite 260 comprises program code instructions for instructing the set of processors 210 to execute the functions of the inventive method, wherein the functions include configuring the data structure 100 (cf. FIG. 1) in the disk system 290. Specifically, the functions of the inventive method include the acts defined in claim 1.

Figure 3:
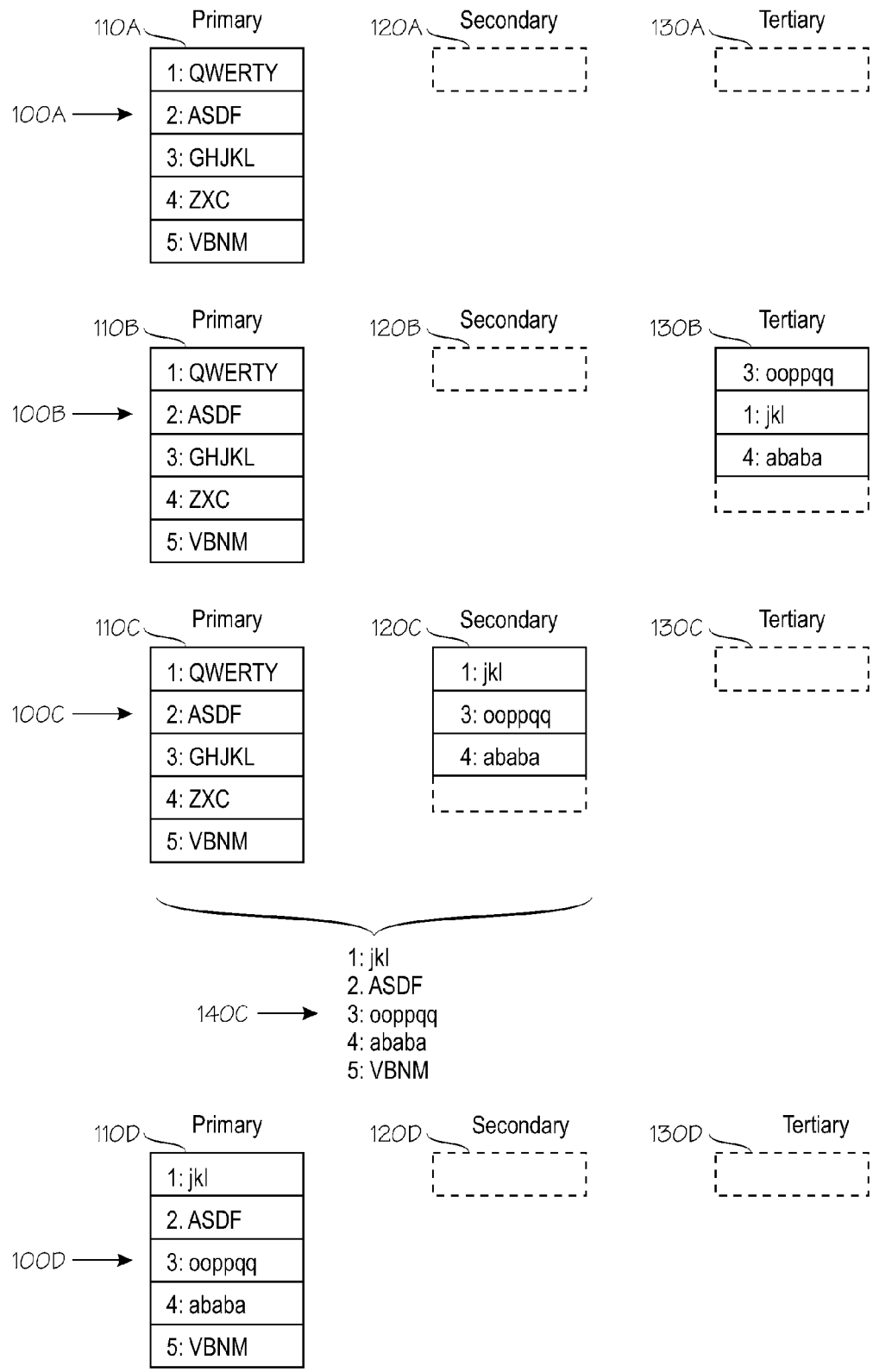
FIG. 3 explains an operating principle of the invention.

FIG. 3 explains an operating principle of the invention. The following description relates to a case wherein one each of the primary, secondary and tertiary data structures are maintained for each column. In some embodiments the database tables may be horizontally partitioned, such that a range of rows corresponds to a partition. In such embodiments it is beneficial to maintain the primary, secondary and tertiary data structures separately for each partition of a column in each partitioned table. Implementing the invention in a partitioned table involves no changes to the drawings, apart from the fact that the primary, secondary and tertiary data structures do not correspond to entire columns but to partitions of the columns.

The status of the primary, secondary and tertiary data structures 110, 120, 130 will be shown in four distinct processing phases, designated by letters A, B, C and D, one of which will be appended to the reference numeral of the respective data structure. For instance, reference numeral 120C refers to the secondary data structure 120 in processing phase C. It should be understood that while data in the primary data structure 110 is actually stored in a compressed format, the present discussion relates to the uncompressed content, so as to allow visual tracking of the flow of information.

In the first processing phase A, the primary data structure 110A is shown with five variable-length data elements numbered with keys 1 through 5. As shown, the contents of the data elements are nonsensical, but they follow a pattern that facilitates following the process through the phases A through D. In that pattern, original content is shown in uppercase letters, while updated content is shown in lowercase letters. In the first processing phase A, the secondary and tertiary data structures 120A, 130A are empty.

In the second processing phase B, the database server receives three update statements and writes the updated values in the tertiary data structure 130B. In the illustrated example, updated content is written for storage keys 3, 1 and 4 (in that order) into the tertiary data structure 130B. In this phase, the secondary data structure 120B remains empty.

In the third processing phase C, an operation to read the data in is initiated, and the database engine makes preparations for that. In the second processing phase B, the tertiary data structure 130B is unsorted, whereby reading its contents requires an exhaustive search through the tertiary data structure 130. In order to expedite reading operations, the updated content for storage keys 3, 1 and 4 is read from the tertiary data structure 130B, sorted by the storage key and written into the secondary data structure 120C. The tertiary data structure 130C becomes empty. The act of reading content from the tertiary data structure, sorting and writing into the secondary data structure are preparatory acts for reading the data in the particular column of the particular table. Finally, when the database is actually read, the reading process is illustrated by reference numeral 140C. In the reading step depicted by reference numeral 140C, data elements for the keys 1 through 5 are read first from the primary data structure 110C, and if an updated version for the data elements is stored in the secondary data structure 120C, that updated version from the secondary data structure 120C overrides the original version from the primary data structure 110C. An equivalent result is obtained from an alternative reading operation wherein data elements are first searched in the secondary data structure 120C, and if the secondary data structure 120C does not have an entry for a data element (such as elements 2 and 5 in the present example), the corresponding data elements are read from the primary data structure 110C. Reference numeral 140C depicts the result of the reading step for keys 1 through 5, wherein data elements with keys 1, 3 and 4 (lower case letters) are read from the secondary data structure 120C, while data elements with keys 2 and 5 (upper case letters) are read from the primary data structure 110C.

The fourth processing phase D illustrates a transaction commit operation. In this operation, the data from primary and secondary data structures are merged, resulting in a new version of the compressed primary data, denoted by reference numeral 110D. In the merge operation, values for storage keys 1, 3 and 4 are read from the secondary data structure 120C, while the values for storage keys 2 and 5 are read from the primary data structure 110C. Merged data will be written in a compressed format into the new version of the compressed primary data structure 110D. The secondary and tertiary data structures 120D and 130D become empty.

Figure 4:
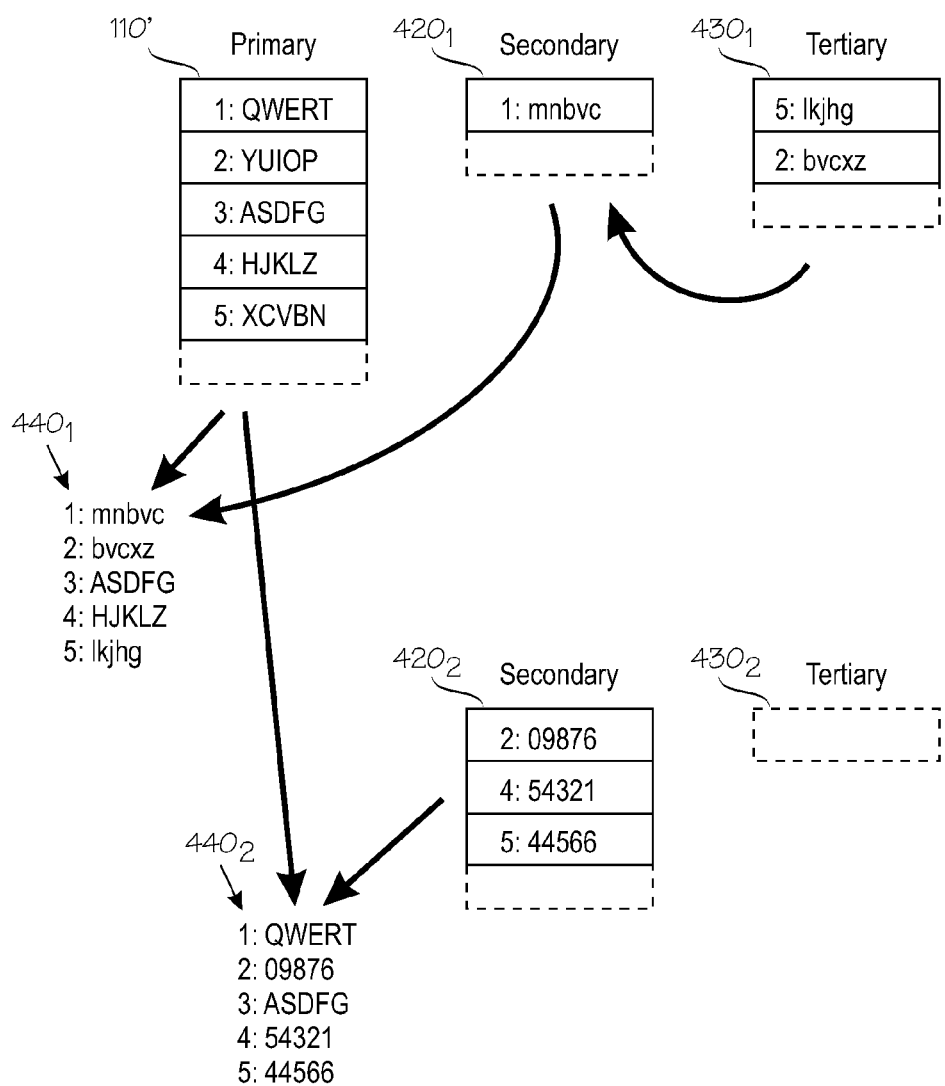
FIG. 4 illustrates mutual isolation of concurrent transactions.

FIG. 4 illustrates mutual isolation of concurrent transactions, ie, transactions that at least partially overlap in time. The scenario shown in FIG. 3 is depicted for one transaction only, and things look quite different for a different, concurrent, transaction. This is illustrated in FIG. 4.

Reference numeral 110' again depicts the primary data structure. But the secondary and tertiary data structures are implemented separately for each transaction, two of which are shown in FIG. 4. (It is obvious that two transactions suffice to illustrate the isolation of transactions, but otherwise the number is purely arbitrary.) Reference numerals $420_1$ and $430_1$ depict, respectively, the secondary and tertiary data structures for a first transaction, while the corresponding data structures for the second transaction are depicted by reference numerals $420_2$ and $430_2$. When the first transaction reads the data elements 1 through 5, the results are depicted by reference numeral $440_1$. Similarly, when the second transaction reads the data elements 1 through 5, the results are depicted by reference numeral $440_2$. As shown in FIG. 4, the data elements unchanged by a transaction are read from the primary data structure 110', while data elements changed by a transaction are read from the secondary data structure of the transaction in question. Thus all transactions are isolated from each other. (Skilled readers will understand that in the present example, the ratio of changed data to unchanged data is purely arbitrary.)

It will be apparent to a person skilled in the art that, as the technology advances, the inventive concept can be implemented in various ways. The invention and its embodiments are not limited to the examples described above but may vary within the scope of the claims.

REFERENCES

1. "C-Store: A Column Oriented DBMS", Mike Stonebraker, Daniel Abadi, Adam Batkin, Xuedong Chen, Mitch Cherniack, Miguel Ferreira, Edmond Lau, Amerson Lin, Sam Madden, Elizabeth O'Neil, Pat O'Neil, Alex Rasin, Nga Tran and Stan Zdonik. VLDB, pages 553-564, 2005.

The invention claimed is:

1. A method for operating an electronic database, the method comprising:
performing following acts by a server computer for each of one or more columns in each of one or more tables:
in a database set-up phase:
  allocating at least one primary data structure, at least one secondary data structure, and at least one tertiary data structure;
in a database write phase:
  writing columnar content in a compressed format into the at least one primary data structure;
in a database update phase:
  writing an updated value for each column of each updated row into the at least one tertiary data structure of the respective column, along with a storage key that indicates a corresponding row in the at least one primary data structure;
in a database query phase:
  reading the updated values and the storage keys from the at least one tertiary data structure, sorting the updated values by their storage keys and storing the sorted values and the storage keys in the sorted order into the at least one secondary data structure, and clearing the at least one tertiary data structure;
  responding to a database query by consulting the at least one primary data structure and the at least one secondary data structure;
in a database commit phase:
  producing a new version of the at least one primary data structure by merging the at least one secondary data structure and an old version of the at least one primary data structure;
wherein the consulting and merging comprise reading a value for a storage key from the at least one secondary data structure if the value exists and otherwise from the at least one primary data structure.

2. The method according to claim 1, further comprising: maintaining the secondary data structure and tertiary data structure separately for each of several concurrent transactions.

3. The method according to claim 1, further comprising: maintaining, for a horizontally partitioned table, a separate primary data structure, secondary data structure and tertiary data structure for each horizontal partition of each of several columns of the horizontally partitioned table.

4. A database server computer for operating an electronic database, the database server computer comprising
   at least one processing unit;
   memory for storing applications and data;
   wherein the memory comprises program code instructions for instructing the at least one processing unit to carry out the following steps for each of one or more columns in each of one or more tables:
   in a database set-up phase:
      allocating at least one primary data structure, at least one secondary data structure, and at least one tertiary data structure;
   in a database write phase:
      writing columnar content in a compressed format into the at least one primary data structure;
   in a database update phase:
      writing an updated value for each column of each updated row into the at least one tertiary data structure of the respective column, along with a storage key that indicates a corresponding row in the at least one primary data structure;
   in a database query phase:
      reading the updated values and the storage keys from the at least one tertiary data structure, sorting the updated values by their storage keys and storing the sorted values and the storage keys in the sorted order into the at least one secondary data structure, and clearing the at least one tertiary data structure;
      responding to a database query by consulting the at least one primary data structure and the at least one secondary data structure;
   in a database commit phase:
      producing a new version of the at least one primary data structure by merging the at least one secondary data structure and an old version of the at least one primary data structure;
   wherein the consulting and merging comprise reading a value for a storage key from the at least one secondary data structure if the value exists and otherwise from the at least one primary data structure.

5. The database server computer according to claim 4, wherein the memory further comprises program code instructions for instructing the at least one processing unit to maintain the secondary data structure and tertiary data structure separately for each of several concurrent transactions.

6. The database server computer according to claim 4, wherein the memory further comprises program code instructions for instructing the at least one processing unit to maintain, for a horizontally partitioned table, a separate primary data structure, secondary data structure and tertiary data structure for each horizontal partition of each of several columns of the horizontally partitioned table.

7. The database server computer according to claim 4, wherein the database server computer comprises multiple processing units and a load-balancing unit for distributing processing load among the multiple processing units.

8. A non-transitory computer program carrier, having encoded thereon a set of computer program instructions, which are executable in a database server computer for operating an electronic database, wherein the database server computer comprises at least one processing unit and memory for storing applications and data;
   wherein execution of the computer program instructions in the database server computer causes the database server computer to carry out the following steps for each of one or more columns in each of one or more tables:
   in a database set-up phase:
      allocating at least one primary data structure, at least one secondary data structure, and at least one tertiary data structure;
   in a database write phase:
      writing columnar content in a compressed format into the at least one primary data structure;
   in a database update phase:
      writing an updated value for each column of each updated row into the at least one tertiary data structure of the respective column, along with a storage key that indicates a corresponding row in the at least one primary data structure;
   in a database query phase:
      reading the updated values and the storage keys from the at least one tertiary data structure, sorting the updated values by their storage keys and storing the sorted values and the storage keys in the sorted order into the at least one secondary data structure, and clearing the at least one tertiary data structure;
      responding to a database query by consulting the at least one primary data structure and the at least one secondary data structure;
   in a database commit phase:
      producing a new version of the at least one primary data structure by merging the at least one secondary data structure and an old version of the at least one primary data structure;
   wherein the consulting and merging comprise reading a value for a storage key from the at least one secondary data structure if the value exists and otherwise from the at least one primary data structure.

9. The non-transitory computer program carrier according to claim 8, wherein execution of the computer program instructions in the database server computer causes the database server computer to maintain the secondary data structure and tertiary data structure separately for each of several concurrent transactions.

10. The non-transitory computer program carrier according to claim 8, wherein execution of the computer program instructions in the database server computer causes the database server computer to maintain, for a horizontally partitioned table, a separate primary data structure, secondary data structure and tertiary data structure for each horizontal partition of each of several columns of the horizontally partitioned table.

* * * * *